(12) United States Patent
Mazurek

(10) Patent No.: US 11,811,302 B1
(45) Date of Patent: Nov. 7, 2023

(54) SINGLE STAGE SYNCHRONOUS SOLID STATE TRANSFORMER SYSTEM

(71) Applicant: Lee Fredrik Mazurek, Groton, CT (US)

(72) Inventor: Lee Fredrik Mazurek, Groton, CT (US)

(73) Assignee: Lee Fredrik Mazurek, Groton, CT (US)

( * ) Notice: Subject to any disclaimer, the term of this patent is extended or adjusted under 35 U.S.C. 154(b) by 0 days.

(21) Appl. No.: 18/336,984

(22) Filed: Jun. 17, 2023

(51) Int. Cl.
*H02M 3/335* (2006.01)
*H02M 1/12* (2006.01)
*H02M 7/219* (2006.01)
*H02M 1/42* (2007.01)

(52) U.S. Cl.
CPC ......... *H02M 1/126* (2013.01); *H02M 1/4208* (2013.01); *H02M 3/33584* (2013.01); *H02M 7/219* (2013.01)

(58) Field of Classification Search
CPC .... H02M 3/01; H02M 3/335; H02M 3/33584; H02M 7/219; H02M 5/02; H02M 5/04; H02M 5/10; H02M 1/42; H02M 1/4208
See application file for complete search history.

(56) References Cited

U.S. PATENT DOCUMENTS

2011/0292703 A1* 12/2011 Cuk ..................... H02M 1/4258 363/126
2017/0098993 A1* 4/2017 Scherbaum ......... H02M 1/4258

* cited by examiner

*Primary Examiner* — Gary L Laxton

(57) ABSTRACT

An input line connected current controlled bridge is dynamically coupled to an output line connected voltage controlled bridge of a single stage bidirectional isolated resonant power supply using a synchronous average harmonic current controller. A bridge current sensor measures low frequency and switching current across nodes of the current controlled bridge. Synchronous average harmonic bridge current is controlled using superimposed non-modulated and modulated feedback respectively to track a line current command and linearize coupling to the voltage controlled bridge. A power factor correction signal drives the line current command to regulate DC voltage busses. A feedforward and feedback trim circuit generates a command to the voltage controlled bridge to track input line voltage with attenuated harmonics. The single stage power supply has a defined interface to synchronize and regulate power sharing for one or more modules.

18 Claims, 6 Drawing Sheets

SINGLE STAGE SYNCHRONOUS SOLID STATE TRANSFORMER SYSTEM

CROSS-REFERENCE TO RELATED APPLICATIONS

This application references the following applications by the same inventor: U.S. non-provisional application Ser. No. 17/727,757 filed Apr. 24, 2022, Ser. No. 17/727,774 filed Apr. 24, 2022, Ser. No. 17/731,632 filed Apr. 28, 2022, and respective U.S. provisional applications 63/197,556 filed Jun. 7, 2021, 63/197,572 filed Jun. 7, 2021, and 63/306,334 filed Feb. 3, 2022.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM

Not applicable

STATEMENT REGARDING PRIOR DISCLOSURES BY THE INVENTOR OR A JOINT INVENTOR

Not applicable

BACKGROUND OF THE INVENTION

The present disclosure generally relates to a solid state transformer power conversion system and, more specifically, to a single stage synchronous solid state transformer resonant power converter system and methods of controlling the same.

Solid state transformers are used to convert isolated AC/AC voltages, similarly to conventional transformers, with potential added benefits of smaller size, improved voltage regulation and filtering, and power factor correction. In some applications, solid state transformers may be part of a system which has AC and DC connections to support bidirectional power storage and generative loads. A prior art (FIG. 1) architecture uses three consecutive stages including: AC/DC rectification and boost power factor correction (100A), isolated DC/DC conversion and regulation (101), and DC/AC inversion (100B). Architectures with symmetric AC/DC (100A) and DC/AC (100B) stages can be configured for bidirectional loads to support energy storage and generation. The illustrated DC/DC converter (101) supports bidirectional power transfer through the use of inductive phase shift control. In prior art, the DC/DC converter may be configured to use a conventional resonant architecture which results in unity (or nearly constant) gain near resonance supplemented by the gains of the power factor correction and inverter stages. In some variations, large energy storage elements (CS1 and CS2) are omitted and inductive elements may be added between stages for a current-fed arrangement. The prior art arrangement shown in FIG. 1 includes DC terminals V1 and V2 which support isolated DC bus connections in addition to the AC terminals (VAC1 and VAC2).

Prior implementations of solid state transformers may have lower efficiency than conventional transformers due to series losses of multiple power stages. It is desirable to develop a single stage solid state transformer with a current controlled connection for power line interface, an isolated regulated voltage controlled line connection, and isolated DC ports.

BRIEF SUMMARY OF THE INVENTION

In one aspect, the objective of this invention is to implement a single stage solid state transformer with isolated current and voltage controlled line connections, and isolated DC bus connections. This objective is accomplished in the present invention by using a current controlled bridge and a voltage controlled bridge coupled by a transformer and resonant impedance to result in a single stage transformer module shown in FIG. 3. A synchronous average harmonic current (SAHC) compensator is used to control on both line current and synchronous average transformer current flowing across the switching nodes of the current controlled bridge. FIG. 2 shows schematic detail of the SAHC compensator and pulse width modulator control process (208) which linearizes sensed current (206) flowing across nodes VC and VD of the current controlled bridge using superimposed non-modulated and modulated feedback relative to a commanded current. The non-modulated feedback signal modifies a duty cycle command to track a commanded current (through a line connected input, VAC2). The modulated feedback signal modifies a phase command to reduce current synchronous to a square (SQ) wave input related to a triangle wave (TRI) used for pulse width modulation. The modulated feedback signal linearizes a coupling relationship between a first bus voltage (V1) and a second bus voltage (V2) by actively superimposing an admittance which linearizes a resonant network (205) to align with the switching frequency. A voltage controlled bridge (201) applies a pulse width modulated (207) voltage (VA relative to VB) to a load (VAC1), where the pulse width modulated voltage is proportional to the bus voltage (V1) and a duty cycle command (VCMD). A dynamic model is given in FIG. 4 to describe the coupling relationship between the voltage busses using a dynamic admittance to couple harmonic current between a primary harmonic voltage and a secondary harmonic voltage. The linearized dynamic relationships resulting from the SAHC controller and respective voltage and current commands are used in an embodiment given in FIG. 5. The embodiment includes power factor correction, isolated DC to DC conversion and a regulated inverter output which is adjusted to reduce distortion relative to a reference using a feedforward regulator with superimposed trim feedback. FIG. 6 shows an embodiment of the present invention which employs one or more synchronous follower modules to share voltage and current respectively. The embodiment in FIG. 6 uses feedforward regulation relationships defined by the SAHC controller to result in controlled voltage and current sharing between each module. Embodiments of the described single stage synchronous solid state transformer system incorporate functions of a multi-stage system with fewer series parts.

These and additional objects and advantages provided by the embodiments described herein will be more fully understood in view of the following detailed description, in conjunction with the drawings.

BRIEF DESCRIPTION OF THE SEVERAL VIEWS OF THE DRAWING(S)

DETAILED DESCRIPTION OF THE INVENTION

Embodiments described herein generally relate to a solid state power transformer and methods of forming a single stage synchronous solid state transformer system with synchronous average harmonic current control. As shown and described herein, new embodiments of solid state transformers with synchronous average harmonic current control are provided. The presently invented system controls the synchronous harmonic current between two isolated bridges to implement power factor corrected input line connection and regulated output line connection in a single stage.

Figure 1:
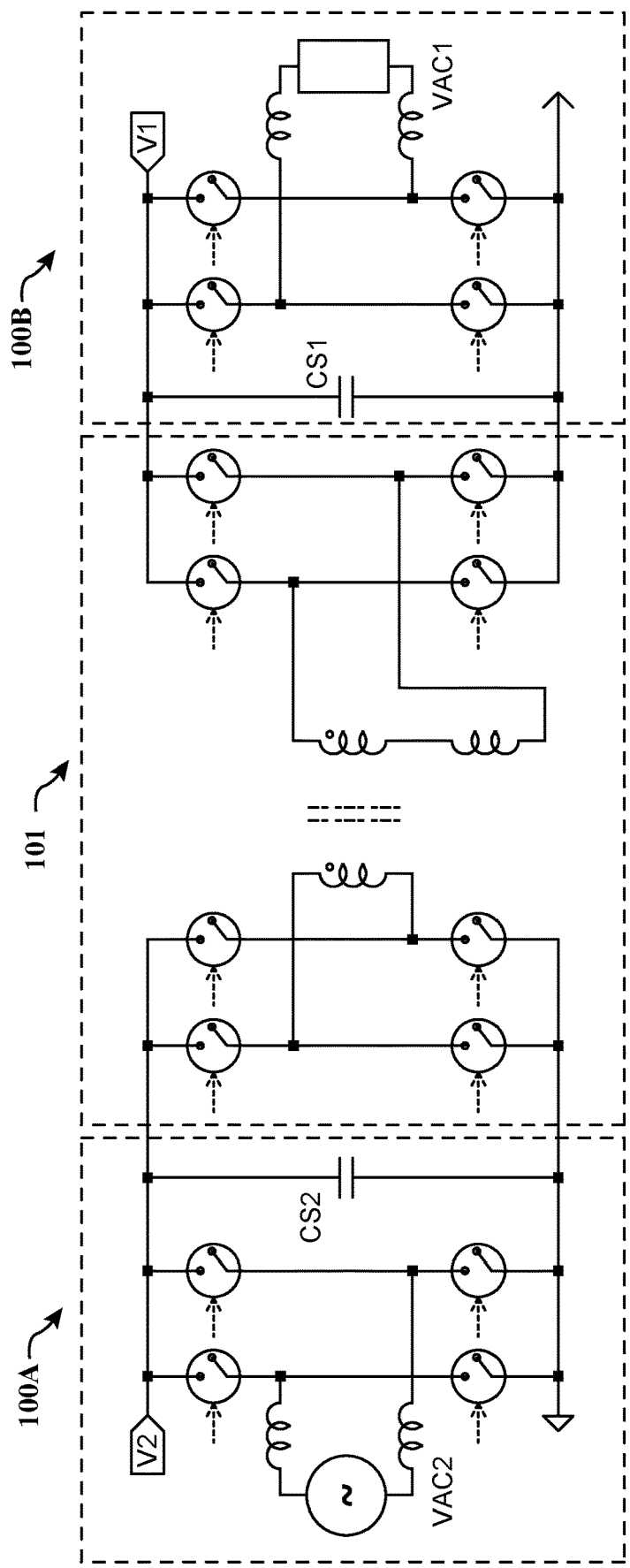
FIG. 1 illustrates a prior art multi-stage solid state transformer.
Figure 2:
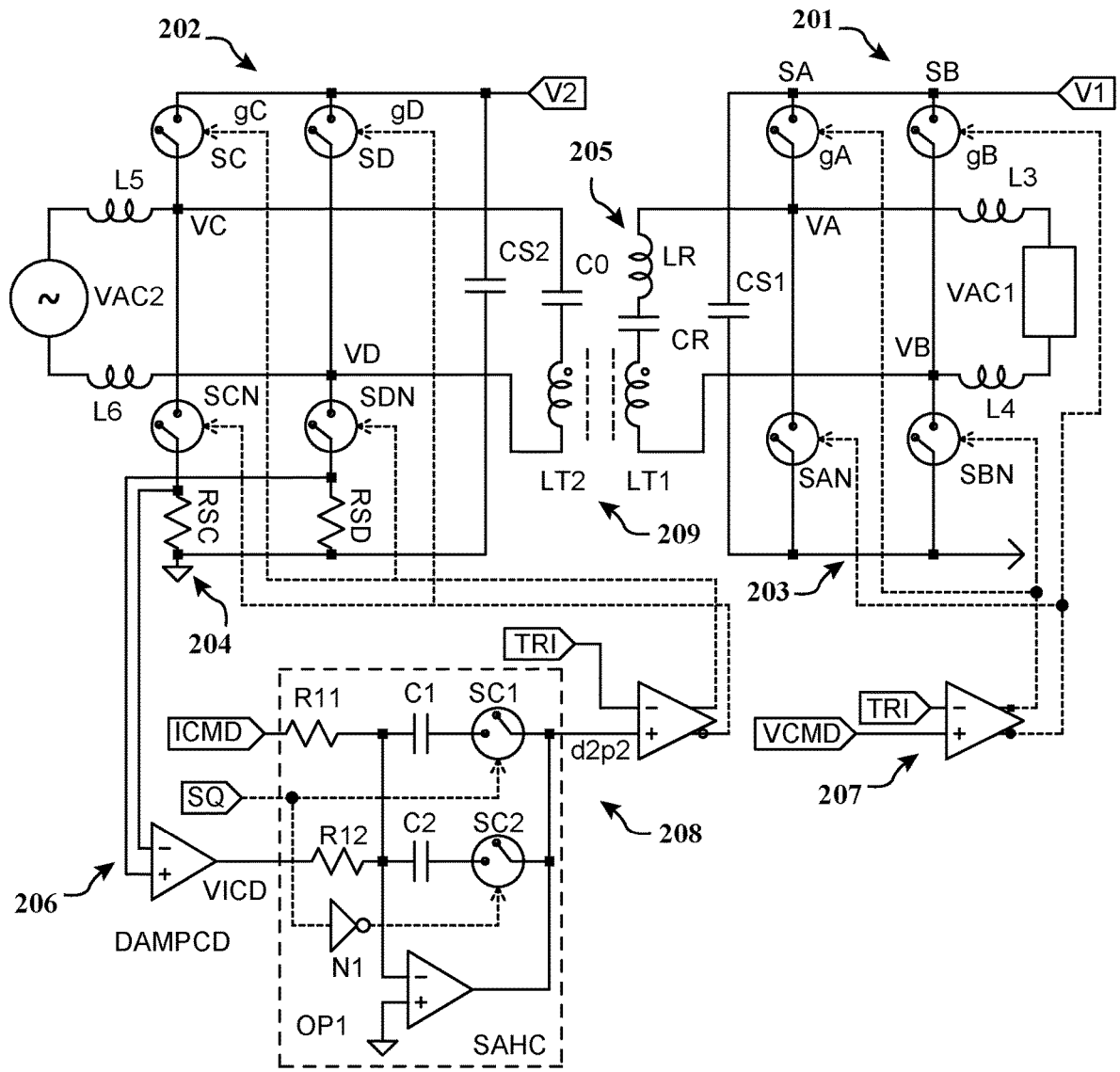
FIG. 2 is a schematic illustrating an embodiment of a single stage synchronous solid state transformer module with a commanded line current and voltage whose respective bus voltages are dynamically coupled by a synchronous harmonic current controller according to one or more embodiments shown and described herein.

An embodiment of a single stage synchronous solid state transformer module is illustrated in FIG. 2. Numbered sections are described and expanded upon, and mathematical principles of a synchronous average harmonic current controller result in simplified equivalent block diagrams shown in FIG. 3 and FIG. 4. The modules developed in FIG. 2, FIG. 3, and FIG. 4 support current and voltage commands which facilitate power factor correction and voltage regulation shown in single stage synchronous solid state transformer embodiments given in FIG. 5 and FIG. 6. The embodiment illustrated in FIG. 2 is comprised of a current controlled bridge (202) coupled through its switching nodes, VC and VD, to both a current controlled line (VAC2), and an isolation transformer (209) with a DC blocking capacitor (C0). A bridge current sensor (206) signal, proportional to the current across nodes VC and VD, sums with a current command (ICMD) to a synchronous average harmonic current (SAHC) compensator which feeds back on current error synchronous with each half period of a square wave (SQ). A SAHC compensated pulse width modulation controller (208), compares a superposition of a non-modulated and modulated feedback command, d2p2, to a synchronous triangle (TRI) waveform. The non-modulated duty cycle feedback results in current through a line connection, VAC2, tracking commanded current, ICMD. The modulated phase feedback results in dynamic linearization of the harmonic voltage coupling between voltage buses, V1 and V2, which minimizes reactive current synchronous with the square wave. A voltage controlled pulse width modulation (207) process controls a voltage controlled bridge (201) using a commanded duty cycle (VCMD) relative to the synchronous triangle waveform. The voltage controlled bridge and current controlled bridge have isolated voltage references (203 and 204), and are coupled by a transformer and a resonant network (205). Dynamic coupling between voltage busses is controlled by the synchronous average harmonic current control process which linearizes the system about the switching frequency using an active admittance. The linearized dynamic coupling results in a harmonic buck-boost relationship between bus voltages based on duty cycles. Components of each block are further described, along with their interfaces and mathematical relationships shown in FIG. 3 and FIG. 4.

The voltage controlled bridge (201) is illustrated in FIG. 2 with nodes VA and VB connected to the voltage controlled line connection (VAC1) through an inductive filter, and to an isolation transformer (209) through a resonant network (205), and across the V1 DC bus (relative reference potential 203). The voltage controlled bridge is further comprised of complementary sets of switching elements, SA and SAN, and SB and SBN. Switch operation is approximated by continuous conduction, with appropriate dead time to reduce cross conduction, as driven respectively by complementary gate signals, gA and gB. The respective switches and their gate drive circuitry are implemented according to the state of the art based on switching and conduction characteristics, with examples including SICFETs, GANFETs, MOSFETs, and IGBTs depending on application. Bridge switching elements may include a diode to prevent reverse bias across the switching element. An energy storage capacitor (CS1) is placed near the bridge between the voltage bus (V1) and reference potential (203). Bridge nodes, VA and VB, are connected to a voltage controlled line (VAC1) through inductors (L3 and L4), and a magnetically coupled transformer inductance (LT1) through the resonant network (205) further comprised of an inductance and capacitance (LR and CR). A voltage controlled pulse width modulation process (207) compares a voltage command (VCMD) and a synchronous triangle waveform (TRI) to generate gate signals, gA and gB. The transformer (209) is further comprised of magnetically coupled inductors (LT1 and LT2) which couple the voltage controlled and current controlled bridges respectively, with a primary harmonic voltage and a secondary harmonic voltage. The transformer may have a unity turns ratio or an arbitrary turns ratio may be used to alter gain with power preserved.

A current controlled bridge (202) is illustrated in FIG. 2 with connections to a current controlled line (VAC2) through an inductive filter, to an isolation transformer (209) through a DC blocking capacitor (C0), and across a DC bus (V2 relative to a reference potential, 204). The current controlled bridge is further comprised of complementary sets of switching elements, SC and SCN, and SD and SDN. Complementary sets are controlled using complementary gate signals, gC and gD, using a continuous conduction approximation with appropriate dead-time to prevent cross conduction. The respective switches are implemented according to the state of the art, with selection balancing application specific cost, switching losses and conduction losses. The respective switches may include diode elements which prevent reverse biasing. Switched bridge nodes, VC and VD, are connected to a current controlled line (VAC2) through an inductive filter (L5 and L6), and a magnetically coupled transformer inductor element (LT2) through a DC blocking capacitor (C0). The embodiment utilizes a blocking capacitor so that AC transformer voltage is coupled to the bridge voltage, and alternate embodiments are possible which include capacitive and inductive elements such as magnetizing inductance that participate in the resonant network (205). Bridge current is sensed in the illustrated embodiment using resistive shunts, RSC and RSD, connected to the source of SCN and SDN respectively. A current amplifier (206) is further comprised of the resistive shunts, RSC and RSD, and a differential amplifier (DAMPCD). The current amplifier drives a bridge current signal, VICD, to a synchronous average harmonic current (SAHC) compensator implemented using a switched capacitor filter. The SAHC compensator forms an error current signal by proportionally summing the bridge current signal (VICD) with a commanded current signal (ICMD), and compensates the error current synchronously with each half period of a square wave (SQ). The SAHC compensator is implemented using a switched capacitor filter which takes an error current injected (using R11 and R12) into the inverting node of an opamp (OP1) and integrates it using switched capacitors, C1 and C2. The respective capacitors are alternately switched into the opamp circuit, synchronously over each half period of the square wave, between the inverting node and output of OP1 using switches SC1 and SC2. The switches encode a superimposed non-modulated and modulated feedback signal, where the common (non-modulated) signal over each half period encodes duty cycle feedback and the difference (modulated) signal over each half-period encodes phase feedback. The SAHC compensated pulse width modulation stage (208) compares the superimposed non-modulated and modulated feedback signal, d2p2, with a synchronous triangle waveform to modulate the gate signals, gC and gD. The error feedback implemented by the SAHC compensator results in current through the line connection (VAC2) tracking the current command (ICMD) and harmonic linearization through the minimization of square wave synchronous reactive transformer current. The linearization is further illustrated using block diagrams FIG. 3 and FIG. 4, and a mathematical description, which are incorporated into additional embodiments of single stage synchronous solid state transformer systems.

The respective voltage controlled (201) and current controlled (201) bridges are illustrated in the embodiment shown in FIG. 2 using full bridge arrangements and may alternately be configured with different bridge arrangements. Examples include the capacitive half bridge, whereby a bridge node (for example VD, VB) is connected to elements which are capacitively coupled to their respective DC bus. A virtual node connection is another example similar to the capacitive half-bridge connection, whereby multiple phases sum onto a point resulting in a low effective impedance at that point due to current cancellation.

Figure 3:
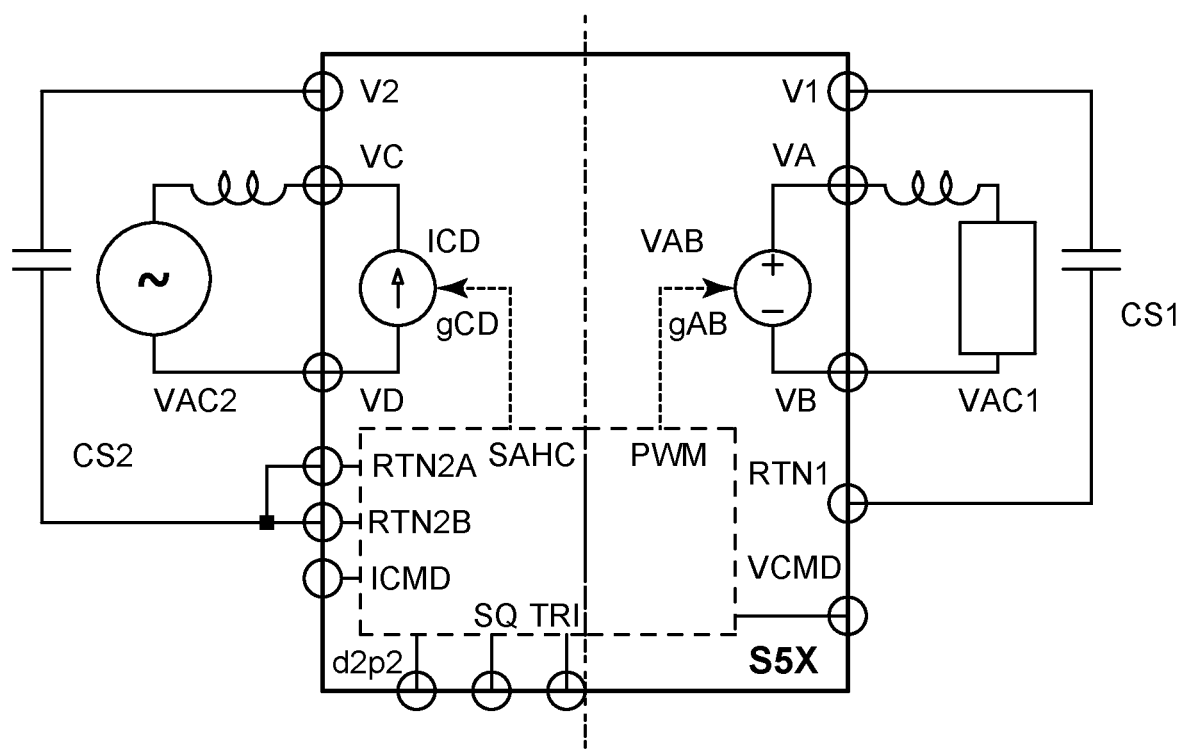
FIG. 3 is a nominal description of a module described in FIG. 2 according to one or more embodiments shown and described herein.

An embodiment of a single stage synchronous solid state transformer (S5X) is illustrated in FIG. 3 which focuses on external connection interfaces. The right edge of the S5X block shows connections to a voltage controlled bridge (such as 201, FIG. 2). The voltage controlled bridge connections include: a DC voltage bus V1 relative to a voltage return (RTN1) reference, a voltage controlled line connection between VA and VB, and a commanded voltage (VCMD). An energy storage capacitor (CS1) is placed across the DC voltage bus, and a voltage controlled line (VAC1) is connected to VA and VB through an inductive filter. A pulse width modulation (PWM) controller generates a differential gate control signal (gAB) which controls the internal voltage source (VAB) as a function of bus voltage (V1 relative to RTN1) and commanded duty cycle (VCMD). The left edge of the S5X block shows connections to a current controlled bridge (such as 202, FIG. 2). The current controlled bridge connections include: a DC voltage bus V2 relative to voltage return (RTN2A and RTN2B) references, a current controlled line connection between VC and VD, and a commanded current (ICMD). An energy storage capacitor (CS2) is placed across the V2 DC voltage bus, and a current controlled line (VAC2) is connected to VC and VD through an inductive filter. A synchronous average harmonic current (SAHC) controller generates a gate control signal (gCD) which controls the internal current source (ICD) as a function of commanded current (ICMD). The bottom edge of the S5X block shows a superimposed duty cycle and phase signal output, d2p2, which may be used for feedforward regulation, and synchronization signal inputs which include a synchronous square wave (SQ) and triangle wave (TRI) used by the SAHC and PWM controllers.

Figure 4:
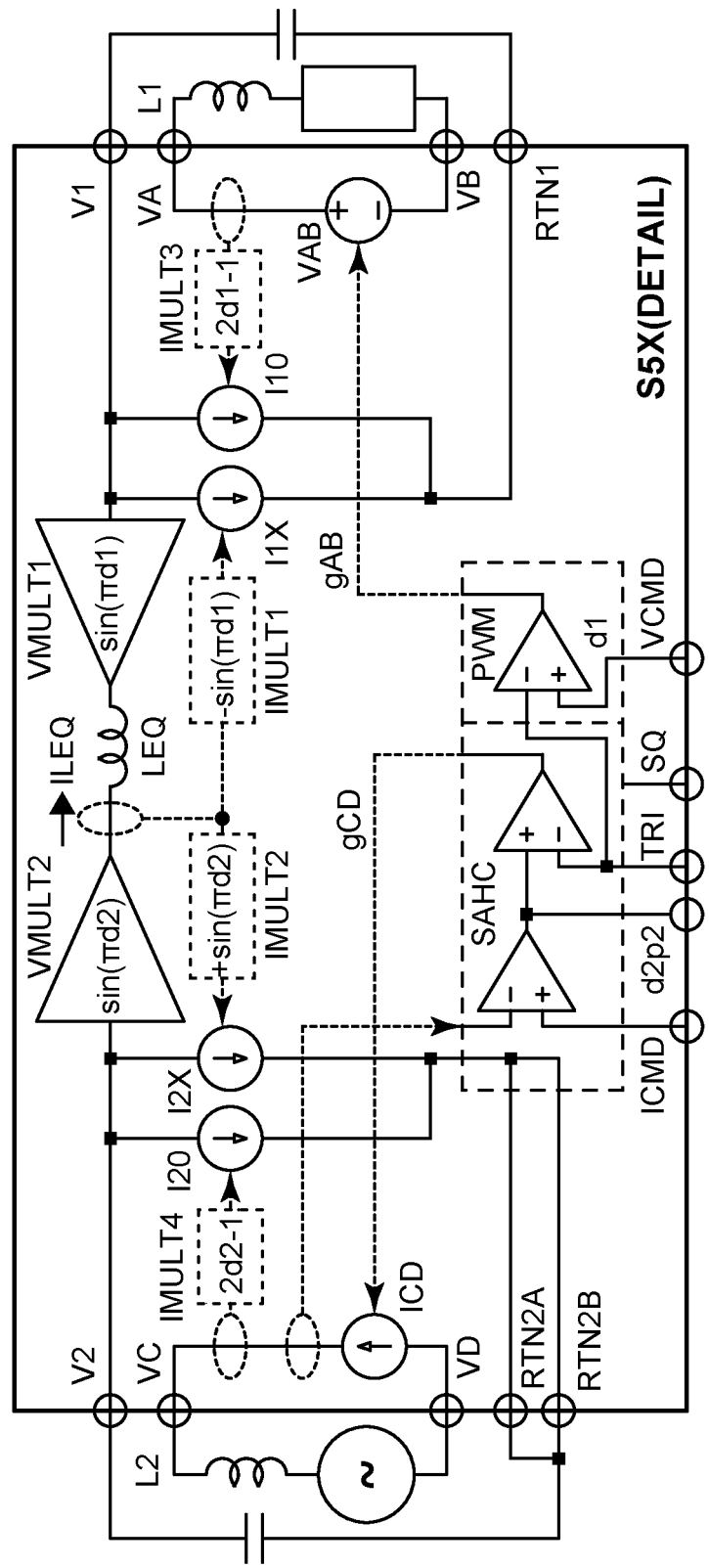
FIG. 4 illustrates a detailed dynamic description of a module described in FIG. 2 according to one or more embodiments shown and described herein.

An embodiment of an internal dynamic model of a single stage synchronous solid state transformer (S5X(DETAIL)) is illustrated in FIG. 4. The right edge of the S5X(DETAIL) block respectively shows a DC bus (V1 relative to RTN1) and voltage controlled line connection (VA relative to VB) interface similar to the S5X block given in FIG. 3. The left edge of the S5X(DETAIL) block respectively shows a DC bus (V2 relative to RN2A and RTN2B) and current controlled line connection (VC relative to VD) interface similar to the S5X block given in FIG. 3. The bottom edge of the S5X(DETAIL) block respectively shows line level interfaces to the synchronous average harmonic current (SAHC) controller and pulse width modulation controller (PWM) including: commanded line current (ICMD), generated duty cycle and phase (d2p2), synchronous triangle (TRI) and square (SQ) waves, and commanded line voltage (VCMD). The synchronous average harmonic current controller simultaneously controls on the duty cycle and phase of the gate signal gCD to control the low frequency bridge current ICD to track commanded current ICMD, and linearize synchronous harmonic current about the switching frequency. Linearized harmonic current flow between isolated bridges (ILEQ) across an equivalent inductor (LEQ) due to harmonic voltage (given by VMULT2 and VMULT1) results from linearized dynamics imposed by the SAHC controller. The output of VMULT1 represents the primary harmonic voltage as a function of the bus voltage (V1) and a harmonic linearization ($\sin(\pi d_1)$) of the voltage controlled bridge gate signal. The output of VMULT2 represents the secondary harmonic voltage as a function of the bus voltage (V2) and a harmonic linearization ($\sin(\pi d_2)$) of the current controlled bridge gate signal. The respective currents, I1X and I2X, given by IMULT1 and IMULT2 result from preserving system power due to isolated harmonic power transfer between the bridges. Power resulting from the internal current source (ICD) is coupled to the DC bus (V2) by IMULT4 which controls current sinking into I20. The current sinks, I20 and I2X, represent superimposed terms using the same current controlled bridge. The pulse width modulation (PWM) controller synchronously controls the gate signal (gAB) of the voltage controlled bridge to result in a voltage, VAB, which is a function of DC bus voltage (from V1 to RTN1) and commanded duty cycle (VCMD which maps to d1). The PWM controller is synchronous with the SAHC controller such that the duty cycle, d1, also linearizes the harmonic power flow. The duty cycle, d1, may be used as a degree of freedom to regulate coupled bus voltage (V1) and line voltage (VAB). The respective current sinks, I1X and I10, represent superimposed terms which balance power due to harmonic power transmission and power coupled to the voltage controlled line.

A mathematical description for one or more embodiments, similar to the internal model shown in FIG. 4, is given for frequency (f) dependent linearized harmonic current flow:

$$I_{LEQ}[f] = -\left(\frac{\pi^2}{8}R_0 + j2\pi f \cdot \frac{\pi^2}{4}L_R\right)^{-1} \cdot (\sin(d_1\pi) \cdot V_1[f] - \sin(d_2\pi) \cdot V_2[f]) \quad \text{EQ1}$$

where $I_{LEQ}[f]$ represents current flow across an equivalent harmonic inductance element due to harmonically weighted (VMULT1 and VMULT2 in FIG. 4) bus voltages, $V_1[f]$ and $V_2[f]$ (or V1 and V2 in FIG. 4). The impedance, $Z_{LEQ}[f]$, of the equivalent harmonic inductance element is:

$$Z_{LEQ}[f] = \frac{\pi^2}{8}R_0 + j2\pi f \cdot \frac{\pi^2}{4}L_R \quad \text{EQ2}$$

where the equivalent harmonic resistance is $$\frac{\pi^2}{8}R_0$$

and the equivalent harmonic inductance is $$\frac{\pi^2}{4}L_R.$$

$R_0$ represents switch and resonant network internal resistance, and $L_R$ represents inductance of the resonant network. The impedance is the frequency dependent relationship which predicts voltage as an output due to current as an input, and the admittance is the inverse of impedance (or current due to voltage). The admittance (or inverse of impedance) is used in EQ1 to predict current flow due to a weighted input voltage.

Bus current transfer as a result of linearized harmonic current flow is given by:

$$I_{1X}[f] = -\sin(d_1\pi) \cdot I_{LEQ}[f] \quad \text{EQ3A}$$

$$I_{2X}[f] = +\sin(d_2\pi) \cdot I_{LEQ}[f] \quad \text{EQ3B}$$

where the current into each bus, $I_{1X}[f]$ and $I_{2X}[f]$, is modulated by the first switching harmonic of respective bridge gate signals resulting in a weight related to the sine of each respective duty cycle.

Power transfer between each respective DC bus and its line connected voltage is illustrated in FIG. 4 using linear calculations for I10 and I20. The frequency dependent loop gain for the non-modulated SAHC compensator feedback signal, $LG_0[f]$, which linearizes current ICD is:

$$LG_0[f] = k[f] \cdot Y_{Ls}[f] \cdot 2 \cdot V_{2,f=DC} \quad \text{EQ4}$$

where a full bridge duty cycle is amplified by DC bus voltage, $V_{2,f=DC}$, and projected through the admittance associated with a series inductor, $Y_{Ls}[f]$, to convert from voltage to current, and projected through a compensator gain, $k[f]$, to command a duty cycle. The series inductor (such as L2 in FIG. 4) has an admittance $Y_{Ls}[f]$ which is given by the inverse of its impedance $Z_{Ls}[f]$. The current source, ICD, modeled in FIG. 4 is a reasonable approximation of non-modulated SAHC control over the loop gain frequency bandwidth of EQ4 (where the magnitude of $LG_0[f]$ is greater than one). The voltage, VAB, (as shown in FIG. 4) is directly commanded by pulse width modulating V1 using d1.

The modulated feedback signal path of the synchronous average harmonic current compensator acts to linearize the harmonic coupling admittance as shown in FIG. 4 (LEQ). The linearized system coupling is described in EQ5A, EQ5B, EQ5C and EQ5D, and simplifies to EQ1 through EQ3 over the control bandwidth. Frequency dependent bus current transfer due to bus voltage perturbations is given as:

$$I_{1:V1}[f] = Y_{(AB,AB)}[f] - \frac{Y_{(AB,S)}[f] \cdot g \cdot k[f] \cdot Y_{(S,AB)}[f]}{1 + g \cdot k[f] \cdot Y_{(S,S)}[f]} \quad \text{EQ5A}$$

$$I_{1:V2}[f] = Y_{(AB,CD)}[f] - \frac{Y_{(AB,S)}[f] \cdot g \cdot k[f] \cdot Y_{(S,CD)}[f]}{1 + g \cdot k[f] \cdot Y_{(S,S)}[f]} \quad \text{EQ5B}$$

$$I_{2:V1}[f] = Y_{(CD,AB)}[f] - \frac{Y_{(CD,S)}[f] \cdot g \cdot k[f] \cdot Y_{(S,AB)}[f]}{1 + g \cdot k[f] \cdot Y_{(S,S)}[f]} \quad \text{EQ5C}$$

$$I_{2:V2}[f] = Y_{(CD,CD)}[f] - \frac{Y_{(CD,S)}[f] \cdot g \cdot k[f] \cdot Y_{(S,CD)}[f]}{1 + g \cdot k[f] \cdot Y_{(S,S)}[f]} \quad \text{EQ5D}$$

where $I_{1:V1}[f]$ is the first bus current flow due to first bus voltage perturbations, and $I_{1:V2}[f]$ is the first bus current flow due to second bus voltage perturbations, whose sum is illustrated in FIG. 4 as I1X. The second bus current flow due to first bus voltage perturbations, $I_{2:V1}[f]$ and the second bus current flow due to second bus voltage perturbations, $I_{2:V2}[f]$, is summed in FIG. 4 as I2X. Each of the currents described in EQ5A, EQ5B, EQ5C, and EQ5D is the superposition of an open loop modulated admittance term and a subtracted active admittance due to control. For example, $Y_{(AB,CD)}[f]$ is the open loop admittance associated with a resonant network admittance (205, FIG. 2) whose output is modulated by gate signal gAB and whose input is modulated by gate signal gCD. The square wave gate signal, gS, is a synchronous square wave used by the SAHC controller, and is 90 degrees out of phase relative to gAB and approximately 90 degrees out of phase relative to gCD. The controller cross admittance terms, which include an S subscript and one of either an AB or a CD subscript such as $Y_{(S,AB)}[f]$, detect conjugate symmetry error of the resonant network admittance about the switching frequency ($f_c$). As an example, the resonant network admittance ($Y_R$) may be calculated by adding the effective series impedance of each element (ie. FIG. 2, 205, CR and LR) and inverting the total network impedance. The controller cross admittance terms act as an error metric which applies conjugate imaginary weights to the resonant network admittance to proportionally subtract $\overline{Y}_R[f_c-f]$ from $Y_R[f_c+f]$, where $\overline{Y}_R$ is the complex conjugate of $Y_R$. For the condition where the loop gain ($LG_1[f]$) is greater than one, each active admittance term subtracts the part of admittance which is parallel with the error metric. Physically, the error metric is minimized when the controller superimposes an active admittance which modifies the resonant network admittance to have a new resonance which aligns with the switching frequency.

The subtracted active admittance due to control simplifies over the bandwidth where the loop gain of the modulated feedback path, $LG_1[f]$, is greater than one. The controlled admittance equations (EQ5A, EQ5B, EQ5C, EQ5D) reproduce the linearized model equations used in FIG. 4 (EQ1, EQ2 and EQ3) over the control bandwidth, and approximate the modeled harmonic inductance outside of the control bandwidth. The modulated feedback path loop gain is:

$$g = \sin(\pi \cdot d_2) \cdot \left(\frac{\pi}{2}\right) \cdot V_{2,f=DC} \qquad \text{EQ6A}$$

$$LG_1[f] = g \cdot k[f] \cdot Y_{(S,S)}[f] \qquad \text{EQ6B}$$

where g is a linearized gain constant relating to the duty cycle operating point, $\sin(\pi \cdot d_2)$, and $V_{2,f=DC}$ is the DC bus voltage (V2). The SAHC compensator frequency dependent gain is $k[f]$. The compensator gain may be modeled using an integrator with time constant given by R11 and double C1 (as shown in FIG. 2) where each switched capacitor (C1 and C2 with equivalent capacitance) integrates an error current signal over half the switching period. The system response due to control input, $Y_{(S,S)}[f]$, is the square wave modulated current due to modulated phase command input. Control bandwidth is defined as the frequency range where the magnitude of $LG_1[f]$ is greater than one.

Open loop modulated admittance terms (used in EQ5A, EQ5B, EQ5C and EQ5D) are:

$$Y_{(AB,AB)}[f] = |g_{AB,k1}|^2 \cdot (\overline{Y}_R[f_c-f] + Y_R[f_c+f]) \qquad \text{EQ7A}$$

$$Y_{(AB,CD)}[f] = (g_{AB,k1} \cdot \overline{g}_{CD,k1}) \cdot \overline{Y}_R[f_c-f] + (\overline{g}_{AB,k1} \cdot g_{CD,k1}) \cdot Y_R[f_c+f] \qquad \text{EQ7B}$$

$$Y_{(CD,AB)}[f] = (g_{CD,k1} \cdot \overline{g}_{AB,k1}) \cdot \overline{Y}_R[f_c-f] + (\overline{g}_{CD,k1} \cdot g_{AB,k1}) \cdot Y_R[f_c+f] \qquad \text{EQ7B}$$

$$Y_{(CD,CD)}[f] = |g_{CD,k1}|^2 \cdot (\overline{Y}_R[f_c-f] + Y_R[f_c+f]) \qquad \text{EQ7D}$$

where each term is a superposition of conjugate resonant network admittances at two frequencies weighted by gate signals. The gate signals, $g_{AB,k1}$ and $g_{CD,k1}$, represent the first harmonic of the switching frequency for pulse width modulation processes illustrated in FIG. 2. For a resonant network (such as FIG. 2, 205, LR and CR), the open loop modulated impedance terms simplify to EQ1 through EQ3 when the open loop natural frequency of the resonant network admittance is tuned to align with the switching frequency. The simplification is due to capacitive admittance being conjugate to inductive admittance on either side of the natural frequency, so that when the first admittance term (of $Y_{(AB,AB)}[f]$ for example) is conjugated (two conjugations cancel) and reflected about the switching frequency, it adds constructively with the second term. The SAHC controller effectively superimposes an active admittance to the open loop modulated admittance to align a closed loop natural frequency with the switching frequency by reducing the conjugate symmetry error about the switching frequency. As a result of the active admittance term, the closed loop equations (EQ5A, EQ5B, EQ5C, EQ5D) converge to the design model (after expanding the gate signals using their first harmonic according a pulse width modulation process).

The controller cross admittance terms (used in EQ5A, EQ5B, EQ5C and EQ5D) are:

$$Y_{(S,AB)}[f] = (g_{S,k1} \cdot \overline{g}_{AB,k1}) \cdot \overline{Y}_R[f_c-f] + (\overline{g}_{S,k1} \cdot g_{AB,k1}) \cdot Y_R[f_c+f] \qquad \text{EQ8A}$$

$$Y_{(S,CD)}[f] = (g_{S,k1} \cdot \overline{g}_{CD,k1}) \cdot \overline{Y}_R[f_c-f] + (\overline{g}_{S,k1} \cdot g_{CD,k1}) \cdot Y_R[f_c+f] \qquad \text{EQ8B}$$

$$Y_{(AB,S)}[f] = (g_{AB,k1} \cdot \overline{g}_{S,k1}) \cdot \overline{Y}_R[f_c-f] + (\overline{g}_{AB,k1} \cdot g_{S,k1}) \cdot Y_R[f_c+f] \qquad \text{EQ8C}$$

$$Y_{(CD,S)}[f] = (g_{CD,k1} \cdot \overline{g}_{S,k1}) \cdot \overline{Y}_R[f_c-f] + (\overline{g}_{CD,k1} \cdot g_{S,k1}) \cdot Y_R[f_c+f] \qquad \text{EQ8D}$$

where $g_{S,k1}$ is the first harmonic of the square wave (SQ), whose integral is the triangle wave (TRI) used for pulse width modulation. The triangle wave is 90 degrees out of phase with the square wave due to the mathematical properties of integration. Assuming a small phase command, the gate signals, $g_{AB,k1}$ and $g_{CD,k1}$, may be modeled as is in phase with the triangle waveform due to the pulse width modulation process. As a result, the gates signals, $g_{AB,k1}$ and $g_{CD,k1}$, are 90 degrees out of phase with the synchronous square wave. Therefore, each first harmonic combination of $g_{S,k1}$ and gate signals, $g_{AB,k1}$ and $g_{CD,k1}$, is an imaginary number. The imaginary numbers which weight the cross admittance terms are conjugate symmetric resulting in sign reversal so that the weighted equations subtract $\overline{Y}_R[f_c-f]$ from $Y_R[f_c+f]$ to form the metric for conjugate symmetry error.

The open loop plant auto admittance term (used to calculate the loop gain of EQ6B) is:

$$Y_{(S,S)} = \left(\frac{4}{\pi^2}\right) \cdot (\overline{Y}_R[f_c-f] + Y_R[f_c+f]) \qquad \text{EQ9}$$

where $Y_{(S,S)}$ is the modulated current response due to modulated phase command. The natural frequency associated with the resonant network, $f_n$, is modulated by the switching frequency, $f_c$, to result in an apparent resonance of the open loop plant auto admittance at $|f_c-f_n|$. For frequencies below $|f_c-f_n|$, the open loop plant auto admittance is capacitive, and for frequencies above $|f_c-f_n|$ the auto admittance is inductive. The inductive auto admittance term dominates the frequency response when $|f_c-f_n|$ is small relative to the control bandwidth. Given that an inductive impedance trends proportionally with increasing frequency, and an inductive admittance trends with one over frequency, the open loop plant auto admittance term has an integrating characteristic. The open loop plant admittance is combined with the compensator to calculate loop gain (EQ6B). An integrating compensator response, as embodied by the SAHC compensator in FIG. 2, may be modified to include stabilizing phase lead, for example by adding a series resistor and capacitor in parallel with each switched capacitor (C1 and C2) in FIG. 2. Alternate methods of phase control such as phase locked loops which use a voltage controlled oscillator (VCO) are unfavorable for this system because the VCO introduces another integrator to the total loop gain. The SAHC compensator embodied in FIG. 2 may be implemented with good stability, as estimated using the loop gains (EQ4 and EQ6B), over a wide range of operating points to robustly model the linearized behavior illustrated in FIG. 2 and FIG. 3.

Embodiments of the resonant power converter, such as illustrated in FIG. 3, reach a current balance when the harmonic voltages are in equilibrium. EQ10 shows the voltage controlled bus harmonic equilibrium at steady state given a regulated bus voltage, V2:

$$\frac{V_1}{V_2} = \frac{\sin(\pi d_2)}{\sin(\pi d_1)} \qquad \text{EQ10}$$

where $V_1$ is related by $V_2$ by the ratio of the sines of respective bridge duty cycles.

The voltage controlled bridge regulates both VAB and V1 relative to V2, where VAB is a function of bus voltage, V1, and duty cycle, d1:

$$V_{AB} = (2 \cdot d_1 - 1) \cdot V_1 \qquad \text{EQ11}$$

where EQ11 equation assumes duty cycle sensitivity for a full bridge. Combining EQ10 and EQ11 results in the average line attached voltage response:

$$\frac{V_{AB}}{V_2} = (2 \cdot d_1 - 1) \cdot \frac{\sin(\pi d_2)}{\sin(\pi d_1)} \qquad \text{EQ12}$$

where the line voltage, $V_{AB}$, has a sensitivity to $d_1$ in the numerator and $\sin(\pi d_1)$ in the denominator. For a system where a linear combination of feedforward and feedback signals is utilized, the sensitivity of $V_{AB}$ to $d_1$ is expanded as:

$$\frac{V_{AB}}{V_2} = (2 \cdot (d_2 + dx) - 1) \cdot \frac{\sin(\pi d_2)}{\sin(\pi (d_2 + dx))} \qquad \text{EQ13}$$

where $d_1$ is expanded to $d_2+dx$ to represent feedforward and feedback regulation. Assuming small perturbations in feedback, $dx$, the derivative of EQ13 is:

$$\frac{d(V_{AB})}{dx} = (2 - \pi \cdot (2 \cdot d_2 - 1) \cdot \text{cotangent}(\pi d_2)) \cdot V_2 \qquad \text{EQ14}$$

where the derivative given in EQ14 is a linear constant for $d_2=0.5$ where both $(2 \cdot d_2-1)$ and cotangent $(\pi d_2)$ are zero, and becomes relatively more nonlinear for $d_2 \neq 0.5$. The relationship in EQ14 is sufficient to design a feedback regulator where clipping is used to ensure feedback gain is bounded. A clipping circuit (such as VHTRIM, FIG. 5) prevents windup and instability outside of a suitable regulation trim range.

Figure 5:
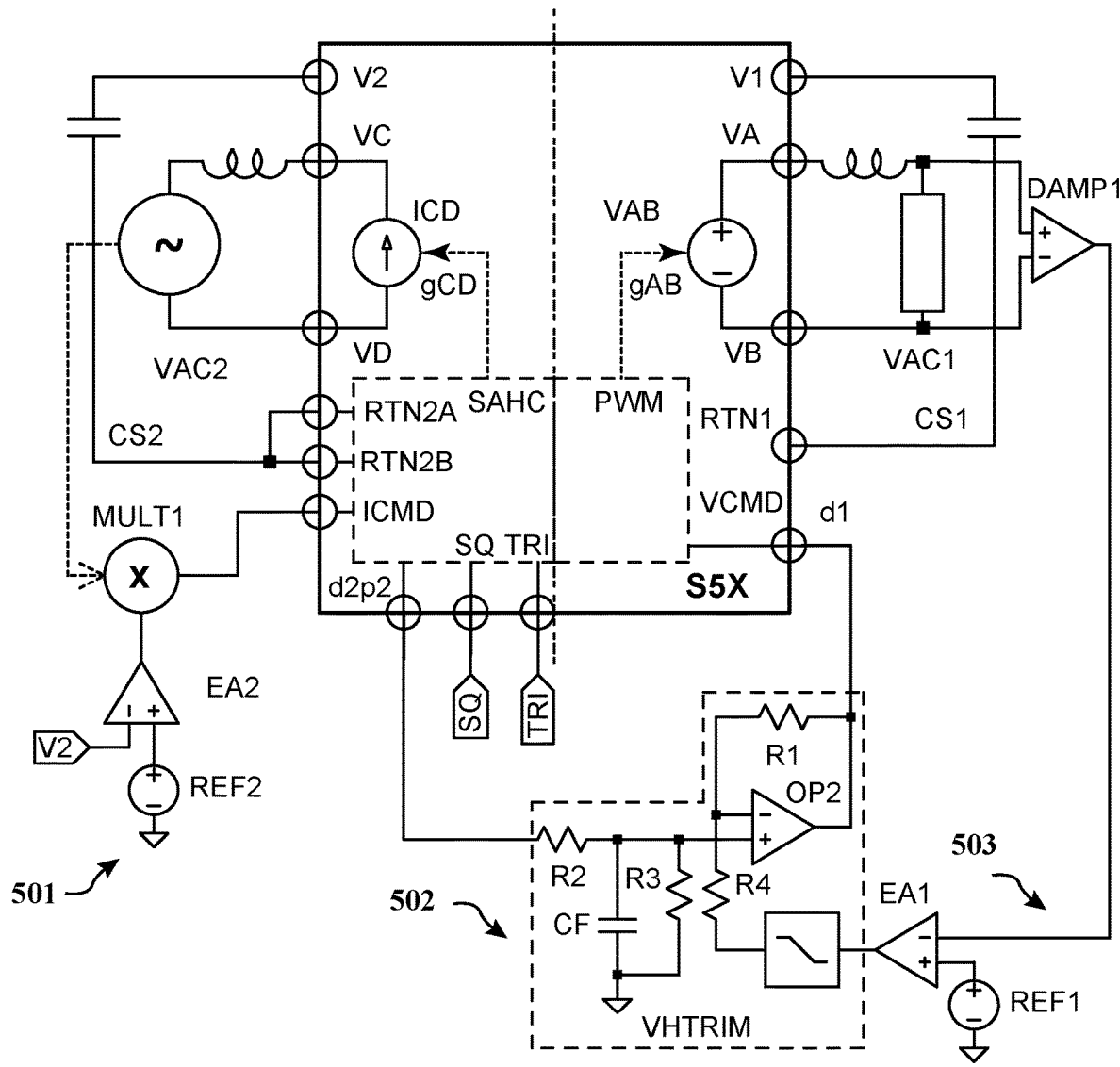
FIG. 5 illustrates an output voltage regulated single stage synchronous solid state transformer system according to one or more embodiments shown and described herein.

An embodiment of a single stage synchronous solid state transformer system is illustrated in FIG. 5 which includes power factor correction and isolated voltage regulation. The S5X block and its associated power terminal connection illustrated in FIG. 5 is similar to one or more embodiments illustrated in FIG. 2, FIG. 3, and FIG. 4. A line connection (VAC2) is sensed in this embodiment as an input to a multiplication process to shape line current (ICD) for power factor correction (PFC). A PFC block (501) is comprised of a multiplier (MULT1), an error amplifier (EA2), and a voltage reference (REF2). The error amplifier (EA2) feeds back on the difference between a scaled voltage reference (REF2) and bus voltage (V2). The commanded output of the error amplifier (EA2) is shaped by the multiplier (MULT1) to command shaped current (ICMD) to the S5X block. The SAHC controller results in the line current (ICD through VAC2) tracking the commanded current, while imposing a dynamic characteristic which couples the bus voltages (V2 and V1) according to EQ10.

Voltage regulation is performed in the embodiment shown in FIG. 5 using a voltage error amplifier (503) and a harmonic voltage trim (502) amplifier (VHTRIM). Feedforward regulation of the duty cycle, d1 relative to d2, results in equilibrium between the DC bus voltages (V2-RTN2 and V1-RTN1), and equilibrium of filtered bridge voltages (inductively filtered VCD and VAB). The harmonic voltage trim amplifier low pass filters d2p2 to feedforward regulate d1 using d2 (with superimposed modulated phase command filtered out). A trim input is generated by the voltage error amplifier (503) which is further comprised of an error amplifier, EA1, a tracking voltage reference (REF1) and a voltage difference amplifier (DAMP1). The voltage error amplifier (503) applies negative feedback to reduce error between the line output voltage and the tracking voltage reference (REF1). The tracking voltage reference is implemented according to the state of the art using a filtered reference, for example using a low pass filter, a bandpass/complementary notch filter or a phase locked loop to filter VAC2. The trimming amplifier (VHTRIM) is set to have a unity lowpass gain to d2, and a wideband input from the voltage error amplifier. The trimming amplifier is further comprised of resistors with matching ratios (R2 and R3, and R1 and R4 respectively), a capacitor which filters the duty cycle input (CF), and an opamp OP2. The trim amplifier is set to limit its trim input from the voltage error amplifier over a valid range. The voltage error amplifier and trimming amplifier work together to result in the voltage controlled line (VAC1) tracking the line voltage (VAC2) connected to the current controlled bridge with noise rejected. The respective energy storage capacitors connected across each bus voltage (CS1 and CS2) are used to buffer unsteady currents. The single stage synchronous solid state transformer (S5X) block, PFC block, and voltage trim controller act together to form a regulated power factor corrected system in a single stage.

Figure 6:
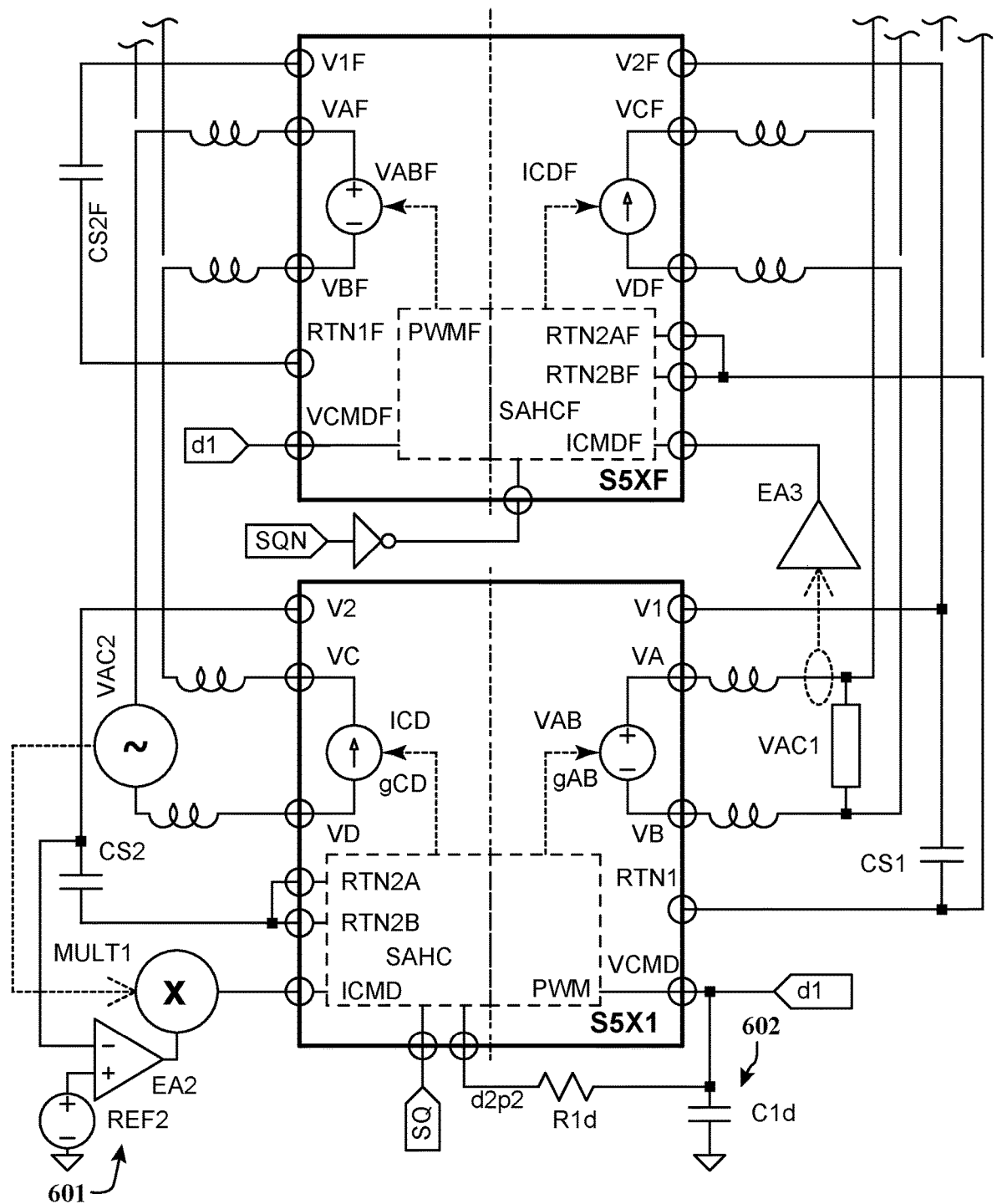
FIG. 6 illustrates a multiple module single stage synchronous solid state transformer system with voltage and current sharing according to one or more embodiments shown and described herein.

An embodiment of a multi-module single stage synchronous solid state transformer system is illustrated in FIG. 6. The multi-module arrangement consists of two or more S5X modules (according to one or more embodiments illustrated in FIG. 2, FIG. 3, and FIG. 4) arranged to share voltage and current. A first module (denoted S5X1) establishes DC bus voltages V1 and V2, and line connected voltages VCD and VAB. The DC bus voltages V1 and V2 track together using a feedforward filter (602). The feedforward filter, comprised of R1d and C1d filters d2p2 to pass the non-modulated duty cycle information (d2) as a feedforward regulation signal (to d1). The SAHC controller linearizes the coupling between the V1 and V2 DC bus resulting in the bus voltages being similar (using d2 to command d1). Inductively filtered bridge voltages VCD and VAB have similar responses due to being commanded with similar duty cycles. The bus voltage V2 is controlled by a power factor correction (PFC) block (601), which operates similarly to the PFC block (501) described in FIG. 5. A multiplier (MULT1) is used to generate a current command (ICMD) using line voltage (VAC2) shaped output from an error amplifier (EA2) which reduces tracking error between the bus voltage (V2) and a reference (REF2). A current source ICDF from or more follower modules (denoted S5XF) is connected inductively in parallel with line voltage VAC1 (and voltage VAB). Follower module S5XF is also inductively connected using a voltage source VABF in series with the line voltage VAC2 (and first module current ICD). The follower module has its terminal labels post-fixed with a capital letter 'F' to indicate its follower position, but is otherwise similar to the S5X embodiments described in FIG. 2, FIG. 3 and FIG. 4. The follower voltage source (VABF) is used to share input line voltage, and the follower current source (ICDF) is used to share power to and from attached loads on the output line. DC busses V1 (relative to RTN1), and V2F (relative to RTN2AF and RTN2BF) are connected in parallel. An error amplifier (EA3) drives the follower current command ICMDF to the SAHCF controller to share current to the line VAC1. Duty cycles d1 and d2 are set equal for the first module using a feedforward filter (602), and feedforward regulation is achieved for the follower module by driving VCMDF using d1. The follower current source ICDF connection to VAB results in its duty cycle also tracking d1, so that each module has similar feedforward regulation duty cycles based on the d2 signal of the first module. An arbitrary number of follower modules may be inductively connected to the follower interfaces (VAF, VBF, VCF, VDF, V2F, RTN2F, ICMDF) to share voltage and current, with synchronization (such as SQ complementary signal SQN) to cancel switching harmonics.

The embodiment illustrated in FIG. 6 implements voltage and current sharing using feedforward regulation, and may be enhanced in additional embodiments to use voltage regulation similar to FIG. 5. The embodiment shown in FIG. 6 can be trimmed by altering a voltage command (VCMD) to the first module (S5X1). Further embodiments are possible which alter a voltage command to a module (VCMDF) to achieve regulation. Commands may be differently applied to multiple follower modules to independently change resulting voltage of the first module (VCD) relative to the series connected line voltage (VAC2). Single stage synchronous solid state transformer modules can be combined according to the embodiments in multiple ways to form a versatile system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A power converter comprising:
a voltage controlled bridge circuit comprising a first plurality of switching devices across a first voltage bus and first energy storage capacitor, wherein the first plurality of switching devices are coupled to a first transformer winding of a transformer device and a first line voltage;
at least one voltage controller circuit configured to generate a voltage command which controls the coupling of the first bus voltage to both the first line voltage and a primary harmonic voltage using the first plurality of switching devices;
a current controlled bridge circuit comprising a second plurality of switching devices across a second voltage bus and second energy storage capacitor, wherein the second plurality of switching devices are coupled to a second transformer winding of the transformer device and a second line voltage;
at least one current controller circuit configured to generate a current command which controls both a bidirectional current to the second line voltage and a secondary harmonic voltage using the second plurality of switching devices;
a resonant network comprised of at least one capacitor and inductor coupled with the first transformer winding or the second transformer winding, or both the first transformer winding and the second transformer winding; and
a synchronous average harmonic current controller comprised of a feedback circuit which reduces a current error signal synchronously averaged over each half of a switching period by altering a modulation waveform of at least one of the first or second controller circuit linearizing a coupling admittance between the primary and secondary harmonic voltage, the current error signal comprising an error between commanded current and a measured current across bridge switching nodes.

2. The power converter of claim 1, wherein the voltage controller circuit is further comprised of:
a filter which generates a voltage regulation duty cycle; and
a pulse width modulation stage which compares a synchronous triangle waveform and the voltage regulation duty cycle.

3. The power converter of claim 2, wherein the filter which generates the voltage regulation duty cycle is further comprised of one or more resistors and one or more capacitors configured to lowpass a duty cycle signal generated by the synchronous average harmonic current controller.

4. The power converter of claim 2, wherein the filter to generate the voltage regulation duty cycle is further comprised of an amplifier which sums a linear combination of a duty cycle signal generated by the synchronous average harmonic current controller and a signal generated by an error amplifier which subtracts the first line voltage from a reference voltage.

5. The power converter of claim 4, wherein the signal generated by the error amplifier is clipped relative to limits.

6. The power converter of claim 1, wherein the current controller generates the current command with a power factor correction circuit comprised of:
a voltage error amplifier which subtracts a signal proportional to the second bus voltage from a voltage reference to generate an average command signal; and
a multiplier which shapes the average command signal by a signal proportional to the second line voltage to generate the current command with shaping.

7. The power converter of claim 1, wherein the synchronous average harmonic current controller is further comprised of:
a switched capacitor filter configured to process the error current signal by integrating and compensating synchronously over each half of the switching period and alternately sampling over each half switching period synchronous with a square wave;
a superimposed non-modulated duty cycle feedback loop circuit configured to reduce the integrated error current signal over the switching period by altering a bridge duty cycle using negative feedback;
a superimposed modulated phase feedback loop circuit configured to reduce a difference in the integrated error current signal over each half switching period by adjusting a phase command using negative feedback; and
a pulse width modulation stage which compares a synchronous triangle waveform and the superposition of non-modulated and modulated integrated error current signal feedback.

8. The power converter of claim 1, further comprising a current sensor which provides a measure of current across bridge switching nodes to drive the synchronous average harmonic current controller wherein the current sensor has at least one resistive shunt and preamplifier.

9. The power converter of claim 1, wherein the transformer device comprises the first transformer winding and the second transformer winding, and further comprising a determined turn ratio.

10. The power converter of claim 1, wherein the first plurality of switching devices comprises a full bridge circuit comprising at least two pairs of switching devices.

11. The power converter of claim 1, wherein the second plurality of switching devices comprises a full bridge circuit comprising at least two pairs of switching devices.

12. The power converter of claim 1, wherein the first plurality of switching devices comprises at least two switching devices coupled to a virtual node formed by a capacitive half bridge or a connection to a power source with cancelling current phases.

13. The power converter of claim 1, wherein the second plurality of switching devices comprises at least two switching devices coupled to a virtual node formed by a capacitive half bridge or a connection to a power source with cancelling current phases.

14. The power converter of claim 1, wherein a three phase line is connected across multiple synchronous power converter modules.

15. The power converter of claim 1, wherein a first module controls on a line current and a line voltage respectively, and one or more follower modules are arranged to use feedforward regulation to share voltage in series with the line current and to share current in parallel with the line voltage.

16. The power converter of claim 15, wherein the follower module is synchronized with a square wave clocking signal which is a logical complement of a square wave clocking signal which synchronizes the first module.

17. A method comprising:
generating a current command which controls a current flowing through a second line voltage coupled to a current controlled bridge to regulate a current controlled bridge bus voltage and secondary harmonic coupling voltage;
harmonically coupling the current controlled bridge to a voltage controlled bridge by sensing, compensating and sampling a synchronous average current over each half switching period, and superimposing a feedback signal on a modulation waveform; and
generating a voltage command which controls a first line voltage coupled to the voltage controlled bridge and regulates a voltage controlled bridge bus voltage and primary harmonic coupling voltage.

18. The method of claim 17 further comprising connecting one or more harmonically coupled power converters to share voltage across a controlled current source and current across a controlled voltage source.

* * * * *